United States Patent
Jian et al.

(10) Patent No.: US 11,229,059 B2
(45) Date of Patent: Jan. 18, 2022

(54) RANDOM ACCESS METHOD AND BASE STATION

(71) Applicant: HUAWEI TECHNOLOGIES CO., LTD., Shenzhen (CN)

(72) Inventors: Bin Jian, Chengdu (CN); Pengfei Li, Chengdu (CN)

(73) Assignee: HUAWEI TECHNOLOGIES CO.. LTD., Shenzhen (CN)

( * ) Notice: Subject to any disclaimer, the term of this patent is extended or adjusted under 35 U.S.C. 154(b) by 199 days.

(21) Appl. No.: 16/727,514

(22) Filed: Dec. 26, 2019

(65) Prior Publication Data

US 2020/0137804 A1    Apr. 30, 2020

Related U.S. Application Data

(63) Continuation of application No. PCT/CN2018/092675, filed on Jun. 25, 2018.

(30) Foreign Application Priority Data

Jun. 30, 2017 (CN) .......................... 201710530516.0

(51) Int. Cl.
*H04W 74/08*     (2009.01)
*H04L 27/26*     (2006.01)
(Continued)

(52) U.S. Cl.
CPC ..... *H04W 74/0833* (2013.01); *H04L 27/2607* (2013.01); *H04W 72/0446* (2013.01); *H04W 72/1205* (2013.01); *H04W 74/006* (2013.01)

(58) Field of Classification Search
CPC ......... H04W 74/0833; H04W 72/0446; H04W 72/1205; H04W 74/006; H04W 56/0045;
(Continued)

(56) References Cited

U.S. PATENT DOCUMENTS 9,025,476 B2 *   5/2015   Weng .................... H04W 48/20
                                                         370/252
2010/0309877 A1  12/2010  Damnjanovic et al.
(Continued)

FOREIGN PATENT DOCUMENTS

| CN | 101523930 A | 9/2009 |
| CN | 101588637 A | 11/2009 |

(Continued)

OTHER PUBLICATIONS

TSG RAN WG1 Meeting #49bis,R1-072898:"Specification of restricted set of cyclic shifts of root Zadoff-Chu sequences",Huawei, Panasonic,Orlando, FL, USA, Jun. 25-29, 2007,total 6 pages.
(Continued)

*Primary Examiner* — Walter J Divito
(74) *Attorney, Agent, or Firm* — Rimon PC

(57) ABSTRACT

Embodiments of this application disclose a random access method. A base station determines that a detected first preamble value is a preamble value from a target terminal. The base station calculates a preamble offset and a time offset of the target terminal. The base station generates at least two random access response messages, where at least one of the at least two random access response messages includes a second preamble value and a second timing advance TA value, and at least one of the at least two random access response messages includes a third preamble value and a third TA value. The base station sends the at least two random access response messages to the target terminal.

12 Claims, 4 Drawing Sheets

(51) Int. Cl.
*H04W 72/04* (2009.01)
*H04W 72/12* (2009.01)
*H04W 74/00* (2009.01)

(58) Field of Classification Search
CPC . H04W 56/0015; H04W 74/00; H04W 74/08; H04W 74/008; H04L 27/2607
See application file for complete search history.

(56) References Cited

U.S. PATENT DOCUMENTS

| | | |
|---|---|---|
| 2013/0288698 A1 | 10/2013 | Rune et al. |
| 2014/0064228 A1 | 3/2014 | Pasad et al. |
| 2014/0185572 A1 | 7/2014 | Dinan |
| 2020/0029370 A1 | 1/2020 | Hu et al. |

FOREIGN PATENT DOCUMENTS

| | | |
|---|---|---|
| CN | 101778482 A | 7/2010 |
| CN | 105165099 A | 12/2015 |
| CN | 106304383 A | 1/2017 |
| CN | 106304388 A | 1/2017 |

OTHER PUBLICATIONS

Ericsson: "4-step random access procedure", 3GPP Draft; R1-1711383,Jun. 26, 2017 (Jun. 26, 2017}, XP051300572,total 18 pages.

Samsung: "Considerations on PRACH design in high-mobility scenario", 3GPP Draft; R1-1710641,Jun. 26, 2017 (Jun. 26, 2017), XP051299848,total 6 pages.

Ericsson: "NR random-access response design", 3GPP Draft; R1-1708731, May 14, 2017 (May 14, 2017), XP051273914,total 8 pages.

Huawei et al: "PRACH preamble format details for long/short sequence length", 3GPP Draft; R1-1710008, Jun. 26, 2017 (Jun. 26, 2017), XP051299233, total 12 pages.

\* cited by examiner

RANDOM ACCESS METHOD AND BASE STATION

CROSS-REFERENCE TO RELATED APPLICATIONS

This application is a continuation of International Application No. PCT/CN2018/092675, filed on Jun. 25, 2018, which claims priority to Chinese Patent Application No. 201710530516.0, filed on Jun. 30, 2017. The disclosures of the aforementioned applications are hereby incorporated by reference in their entireties.

TECHNICAL FIELD

This application relates to the communications field, and in particular, to a random access method and a base station that implements such method.

BACKGROUND

In a long term evolution (LTE) network, a process in which a terminal accesses a base station through a random access channel (RACH) is an important part of terminal access, re-synchronization, and handover. A basic principle of an RACH access process is as follows: The terminal sends a preamble ID, the base station detects the preamble ID and a timing advance (TA) value, and the base station sends a random access response (RAR) message to the terminal. If the preamble ID carried in the RAR received by the terminal is consistent with the preamble ID already sent by the terminal, the terminal sends a MSG 3 (message 3) by using an uplink resource in the RAR, indicating that the access succeeds. If the preamble ID in the RAR received by the terminal is inconsistent with the already sent preamble ID, the terminal does not send the MSG 3, indicating that the access fails.

Due to a complex current network site and environment, a high-speed terminal may access/hand over to a low-speed cell in a current network, and a preamble ID detected by the base station in the low-speed cell based on a low-speed cell feature is inconsistent with a preamble ID actually sent by the high-speed terminal. Consequently, the terminal's RACH access in the low-speed cell fails, and the terminal cannot successfully access the base station or be successfully handed over to the base station.

SUMMARY

Embodiments of this application provide a random access method and a base station, to increase the success rate of accessing a base station by a terminal.

A first aspect of the embodiments of this application provides a random access method, applied to a contention-based access process. The method includes the following steps:

A base station detects a preamble value sent by a terminal. If a plurality of preamble values are detected within a period of time, it indicates that a high-speed terminal probably needs to access the base station, and these preamble values are all preamble values retransmitted by the terminal. In this case, the base station determines that a currently detected first preamble value is a preamble value sent by the target terminal. The first preamble value may be inconsistent with the preamble value sent by the target terminal. If the base station directly sends the detected first preamble value to the terminal, consequently, the terminal may fail to access the base station. To enable the terminal to access the base station, the base station may first calculate a preamble offset and a time offset of the target terminal. The base station then generates at least two random access response messages, where the at least two random access response messages include at least a second preamble value and a second timing advance TA value, and include at least a third preamble value and a third TA value. The second preamble value is the same as the first preamble value detected by the base station, the second TA value is the same as a first TA value that corresponds to the first preamble value detected by the base station, and the third preamble value is a sum of the first preamble value and the preamble offset or a difference between the first preamble value and the preamble offset. For example, the third preamble value is a preamble value obtained by adding the first preamble value and the preamble offset, or a value obtained by subtracting the preamble offset from the first preamble value. The third TA value is a sum of the first TA value and the time offset or a difference between the first TA value and the time offset. For example, the third TA value is a TA value obtained by adding the first TA value and the time offset, or a TA value obtained by subtracting the time offset from the first TA value. The base station then sends the at least two random access response messages to the target terminal. In this way, the target terminal can successfully access the base station provided that in a plurality of RAR messages, there is a preamble value the same as the preamble value sent by the target terminal, thereby increasing a success rate of accessing the base station by the terminal.

In a possible implementation, the at least two random access response messages generated by the base station each carry instruction information of an uplink resource allocated by the base station to the target terminal. In this way, after the target terminal receives the random access response message, if a preamble value obtained by the target terminal by parsing the random access response message is consistent with the preamble value sent by the target terminal, the target terminal may send an uplink message on the uplink resource indicated by the instruction information.

A second aspect of the embodiments of this application provides a random access method, applied to a non-contention-based access process. The method includes the following steps:

A base station first allocates a preamble value to a target terminal. When the base station detects a first preamble value, and if the first preamble value is a preamble value falling within an allocated area, but is different from the preamble value allocated by the base station, the base station may determine that the detected first preamble value has an offset. To enable the target terminal to access the base station, the base station may calculate a preamble offset of the target terminal. The base station performs addition or subtraction on the first preamble value and the calculated preamble offset, and then determines whether an obtained second preamble value is the same as the preamble value allocated by the base station. If the obtained second preamble value is the same as the preamble value allocated by the base station, it indicates that the first preamble value detected by the base station is a preamble value sent by the terminal to which the base station has allocated the preamble value. The base station adds the calculated second preamble value to a generated random access response message, and sends the generated random access response message to the target terminal. In this way, for a preamble value sent by a terminal that is in high-speed movement, even if there is an offset between the preamble value detected by the base station and the preamble value sent by the terminal, the base station can also determine a value of the preamble value sent by the terminal, and send the determined preamble value to the terminal, so that the terminal can successfully access the base station, thereby increasing an access success rate of the terminal.

In a possible implementation, before the base station generates the random access response messages, the method may further include the following steps:

The base station calculates a time offset of the target terminal. The random access response message generated by the base station further includes a second timing advance TA value, the second TA value is a sum of the first TA value and the time offset or a difference between the first TA value and the time offset, and the first TA value is a TA value corresponding to the first preamble value detected by the base station. In this way, the base station not only adjusts a detected preamble value, but also adjusts a detected TA value, so that the terminal can implement time synchronization with the base station based on the adjusted TA value, and the terminal can access the base station more accurately.

A third aspect of the embodiments of this application provides a base station, applied to a contention-based access process. The base station includes:

a determining unit, configured to determine that a detected first preamble value is a preamble value sent by a target terminal;

a calculation unit, configured to calculate a preamble offset and a time offset of the target terminal;

a generation unit, configured to generate at least two random access response messages, where in the at least two random access response messages: at least one of the at least two random access response messages includes a second preamble value and a second timing advance TA value, and at least one of the at least two random access response messages includes a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset; and a sending unit, configured to send the at least two random access response messages to the terminal.

A fourth aspect of the embodiments of this application provides a base station, applied to a non-contention-based access process. The base station includes:

a detection unit, configured to detect a first preamble value;

a calculation unit, configured to calculate a preamble offset of a target terminal if the first preamble value is a preamble value falling within an allocated area, and is different from the preamble value allocated by the base station for the target terminal;

a determining unit, configured to determine whether a second preamble value is the same as the preamble value allocated by the base station;

a generation unit, configured to generate a random access response message when the second preamble value is the same as the preamble value allocated by the base station, where the random access response message includes the second preamble value, and the second preamble value is a sum of the first preamble value and the preamble offset or a difference between the first preamble value and the preamble offset; and a sending unit, configured to send the random access response message to the target terminal.

A fifth aspect of the embodiments of this application provides a base station. The base station includes a processor, a memory, and a transceiver, where the processor, the memory, and the transceiver are connected by using a bus, the memory stores a computer instruction, and the processor executes the computer instruction to implement the following methods:

determining that a detected first preamble value is a preamble value sent by a target terminal;

calculating a preamble offset and a time offset of the target terminal;

generating at least two random access response messages, where in the at least two random access response messages: at least one of the at least two random access response messages includes a second preamble value and a second timing advance TA value, and at least one of the at least two random access response messages includes a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset; and sending the at least two random access response messages to the target terminal; or the processor executes the computer instruction to further implement the following methods:

detecting the first preamble value;

calculating the preamble offset of the target terminal if the first preamble value is a preamble value falling within an allocated area, and is different from a preamble value allocated by the base station for the target terminal;

generating a second preamble value by calculating a sum of or a difference between the first preamble value and the preamble offset;

determining whether the second preamble value is the same as the preamble value allocated by the base station;

generating the random access response message when the second preamble value is the same as the preamble value allocated by the base station, where the random access response message includes the second preamble value; and sending the random access response message to the target terminal.

A sixth aspect of the embodiments of this application provides a storage medium. The storage medium may be transitory or non-transitory and stores a computer instruction used to implement the random access method according to any one of the manners of the first aspect or the second aspect.

A seventh aspect of the embodiments of this application provides a computer program product. The computer program product includes a computer software instruction, and the computer software instruction may be loaded by a processor to implement the process of the random access method according to any one of the manners of the first aspect or the second aspect.

A eighth aspect of the embodiments of this application provides a chip system. The chip system includes a processor, configured to support a base station in implementing the function in the foregoing aspects, for example, generating or processing the information in the foregoing methods. In a possible design, the chip system further includes a memory. The memory is configured to store a program instruction and data that are necessary for supporting the base station. The chip system may include a chip, or may include a chip and another peripheral, ancillary, or supporting component.

It can be learned from the foregoing technical solutions that the embodiments of this application have the following advantages:

When determining that a detected preamble ID may be a preamble ID sent by a high-speed terminal, a base station calculates a corresponding preamble offset and a corresponding time offset, and generates a plurality of RAR messages, where the plurality of RAR messages include an RAR message including a second preamble value the same as a first preamble value, and an RAR message including a third preamble value different from the first preamble value, and the third preamble value is obtained by adding the first preamble value and the preamble offset. The base station sends the plurality of generated RAR messages to the terminal. In this way, the terminal can successfully access the base station provided that in a plurality of RAR messages, there is a preamble value the same as a preamble value sent by the terminal, thereby increasing a success rate of accessing the base station by the terminal.

DESCRIPTION OF EMBODIMENTS

Embodiments of this application provide a random access method and a base station, to increase a success rate of accessing the base station by a terminal.

Figure 1:
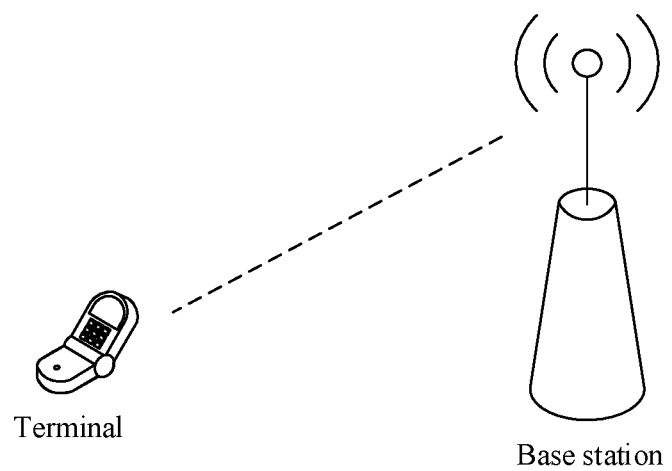
FIG. 1 is a schematic diagram of a system architecture to which a random access method is applied according to an embodiment of this application.

FIG. 1 is a schematic diagram of a system architecture to which a random access method is applied according to an embodiment of this application. The architecture includes a base station and a terminal. An uplink random access process in an LTE system uses a non-synchronous access mode. To be specific, when the terminal has not obtained uplink time synchronization or lost synchronization, a process that is used by the base station to estimate and adjust an uplink transmit clock of the terminal is also used by the terminal to request the base station to allocate a resource. The base station responds to a non-synchronous random access attempt of the terminal, sends timing information to the terminal to adjust uplink transmit timing, and allocates an uplink resource for the terminal to transmit data or control signaling. In addition, timing information and uplink data resource allocation may also be combined together and sent to the terminal or UE. The random access process has two modes: one mode is contention-based random access and the other mode is non-contention-based random access. In the LTE system, each cell has 64 available preamble IDs. For a contention-based random access process, the terminal randomly selects one preamble sequence to initiate the random access process to a network side. Therefore, if a plurality of terminals use a same preamble sequence to initiate the random access process at a same moment, a conflict may arise, and an access failure may occur. For a non-contention-based random access, a preamble sequence allocated by the base station is used to initiate a random access process, and therefore the access success rate is relatively high. However, considering that the base station can learn in advance that the terminal needs to initiate the random access process only in a handover scenario or in a downlink data sending scenario, the non-contention-based random access may be used only in these two scenarios, and the contention-based random access is used in other application scenarios.

A preamble value in this application is also known as a preamble ID. A high-speed terminal is a terminal with a relatively high moving speed. A low-speed cell is a cell served by a base station in which preamble ID detection is performed at relatively low frequency, and a high-speed cell is a cell served by a base station in which preamble ID detection is performed at relatively high frequency. When the quantities of root sequences are the same, a quantity of preamble resources that can be generated in a high-speed cell is less than that generated in a low-speed cell, and user access is affected. To maintain the same preamble resources as those in a low-speed cell, the root sequences available to a high-speed cell are relatively small, and it is difficult to plan the root sequence. The base station in this application is a base station serving a low-speed cell.

Figure 2:
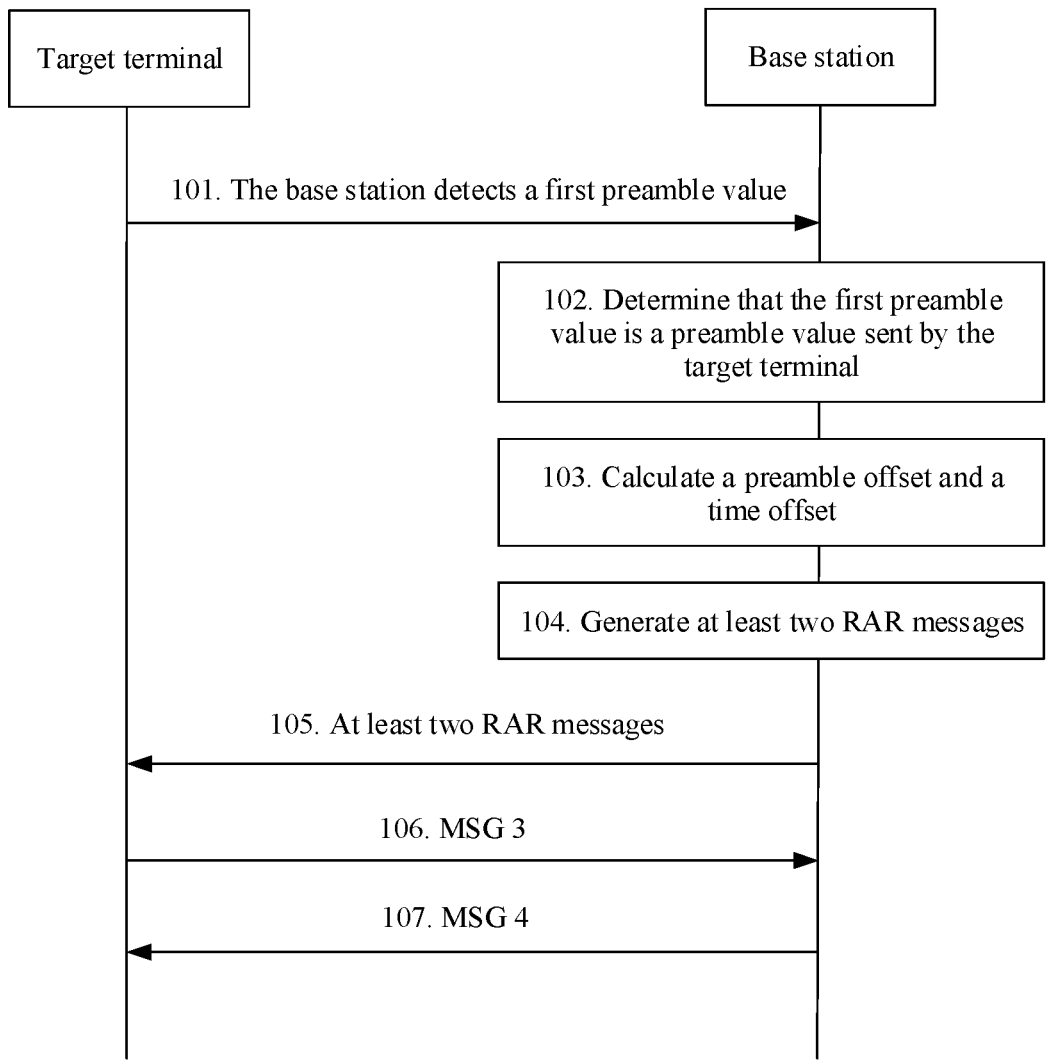
FIG. 2 is a schematic diagram of an embodiment of a random access method according to an embodiment of this application.

FIG. 2 is a schematic diagram of an embodiment of a random access method based on a contention-based access process according to an embodiment of this application. The method includes the following steps.

101. A base station detects a first preamble value.

A terminal randomly selects one preamble sequence from a plurality of preamble sequences, and sends the preamble sequence to the base station on an RACH channel. The base station detects the preamble ID within a cyclic shift (Ncs-cyclic or Ncs) interval, and correlates the preamble ID with all preamble IDs. If a maximum peak can be obtained in the Ncs interval, it is determined that the detected preamble ID is a valid preamble ID, and the corresponding TA value is determined. When the terminal is in high-speed movement, the preamble ID detected by the base station may be different from the preamble ID sent by the terminal. For example, the preamble ID detected by the base station is less than the preamble ID sent by the terminal, for example, the preamble ID sent by the terminal is 2, and the preamble ID detected by the base station is 1. Therefore, in this case, the terminal cannot access the base station, and the terminal retransmits the preamble ID at a preset period.

102. The base station determines that the detected first preamble value is a preamble value sent by a target terminal.

Optionally, the determining, by the base station that the detected first preamble value is a preamble value sent by a target terminal may be:

if a quantity of preamble values detected by the base station within a preset time exceeds a preset threshold, determining, by the base station, that the currently detected first preamble value is a preamble value sent by a target terminal.

For example, if the base station receives four of the same preamble IDs within one second, it indicates that one terminal may be attempting to gain access by retransmitting a preamble ID. Based on this, the base station determines that the terminal is a high-speed terminal.

103. The base station calculates a preamble offset and a time offset of the target terminal.

Optionally, the calculating, by the base station, a preamble offset and a time offset of the target terminal may be:

calculating, by the base station, the preamble offset and the time offset of the target terminal based on a cell logical root sequence and a first cyclic shift (Ncs) of the base station, where the first Ncs is an Ncs used by the base station to detect the first preamble value.

For example, if a logical root sequence configured by the base station is 700, and a first Ncs is 15, it may be calculated that a frequency offset (du) of a cell is 124, a preamble offset that may be generated is: du/Ncs=124/15=9, and a corresponding time offset is: 1.831*124=227 TA.

104. The base station generates at least two random access response messages.

In the at least two random access response messages: at least one of the at least two random access response messages includes a second preamble value and a second timing advance TA value, and at least one of the at least two random access response messages includes a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset.

For example, A preamble ID=x and a TA value=y are detected by the base station. The base station generates three groups of RAR messages: in a first group, a preamble ID=x, and a TA value=y; in a second group, a preamble ID=x+9, and a TA value=y+227 TA; and in a third group, a preamble ID=x−9, and a TA value=y−227 TA. The first group of RAR messages indicate that no offset is generated, the second group of RAR messages indicate that a forward offset is generated, and the third group of RAR messages indicate that a backward offset is generated.

Optionally, the at least two random access response messages each carry instruction information of an uplink resource allocated by the base station to the target terminal, and the instruction information is used to instruct the target terminal to send an uplink message by using the uplink resource.

105. The base station sends the at least two random access response messages to the terminal.

After receiving a plurality of RAR messages, the terminal parses each RAR message, and if a preamble ID carried in an RAR message is consistent with the preamble ID sent by the terminal, determines the RAR message as a target RAR message.

106. The terminal sends an uplink message to the base station by using the uplink resource.

Optionally, the terminal adjusts an uplink sending time based on a TA value in the target random access response message, and sends, based on the adjusted sending time, an uplink message to the base station by using the uplink resource. The uplink message may be a MSG 3. The terminal may obtain uplink synchronization based on a TA adjustment amount in the target RAR message, and transmit the MSG 3 on the uplink resource allocated by the base station to the terminal, to facilitate subsequent data transmission.

107. The base station sends a downlink message to the terminal.

The downlink message may be a MSG 4 (message 4), and the base station and the terminal finally complete contention-based access by using the MSG 4.

In this embodiment of this application, when determining that the detected preamble ID may be the preamble ID sent by the high-speed terminal, the base station calculates the corresponding preamble offset and the corresponding time offset, and generates a plurality of RAR messages. The plurality of RAR messages include the RAR message including the second preamble value the same as the first preamble value, and the RAR message including the third preamble value different from the first preamble value. The third preamble value is obtained by adding the first preamble value and the preamble offset. The base station sends the plurality of generated RAR messages to the terminal. In this way, the terminal can successfully access the base station provided that in the plurality of RAR messages, there is a preamble value the same as the preamble value sent by the terminal, thereby increasing the success rate of accessing the base station by the terminal.

Figure 3:
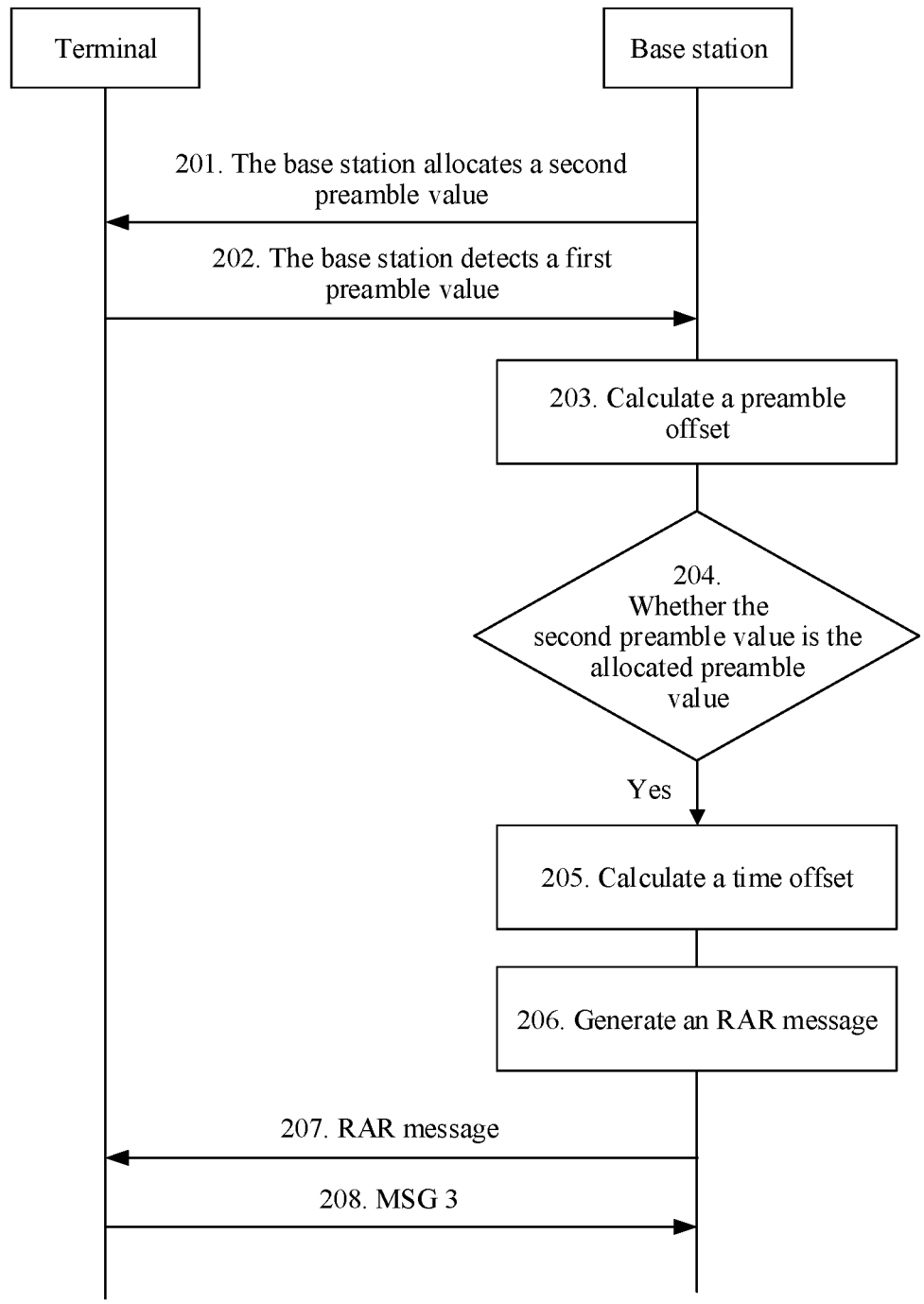
FIG. 3 is a schematic diagram of another embodiment of a random access method according to an embodiment of this application.

FIG. 3 is a schematic diagram of an embodiment of a random access method based on a non-contention-based access process according to an embodiment of this application. The method includes the following steps.

201. A base station sends an allocated second preamble value to a terminal.

For the non-contention access process, the base station needs to first allocate preamble IDs to the terminal. For example, the base station randomly selects one preamble ID from the plurality of preamble IDs, and sends the preamble ID to the terminal.

202. The base station detects a first preamble value.

After the base station sends the allocated preamble ID to the terminal, the terminal sends the received preamble ID to the base station by using an RACH channel. The base station detects the preamble ID sent by the terminal. When the terminal may be in high-speed movement, the preamble ID detected by the base station may be different from the preamble ID sent by the terminal. For example, the preamble ID detected by the base station is less than the preamble ID sent by the terminal, for example, the preamble ID sent by the terminal is 2, and the preamble ID detected by the base station is 1. Therefore, in this case, the terminal cannot access the base station for a plurality of times, and the terminal retransmits the preamble ID at a preset period.

203. The base station calculates a preamble offset of a target terminal if the first preamble value is a preamble value falling within an allocated area, and is different from a preamble value allocated by the base station.

The allocated area is a small neighboring range surrounding the preamble ID randomly selected by the base station and allocated for the terminal. If the preamble ID detected by the base station is a preamble ID falls within the area, but is different from the preamble ID allocated by the base station for the terminal, it indicates that the preamble ID detected by the base station has an offset. Therefore, the base station can calculate the preamble offset of the terminal. For a specific calculation manner, refer to the descriptions of the embodiment of FIG. 2, and details are not described herein.

204. The base station determines whether a second preamble value is the same as the preamble value allocated by the base station, where the second preamble value is a sum of the first preamble value and the preamble offset or a difference between the first preamble value and the preamble offset.

If the preamble ID obtained by adding the preamble ID detected by the base station and the calculated preamble offset is consistent with the preamble ID allocated by the base station, it indicates that the terminal is a terminal to which the base station has allocated the preamble ID, and the base station needs to enable the terminal to access the base station.

205. The base station calculates a time offset of the target terminal.

The base station further needs to calculate a corresponding time offset, so that the base station can adjust an uplink information sending time. For a specific calculation manner, refer to the descriptions of the embodiment of FIG. 2, and details are not described herein.

206. The base station generates a random access response message, where the random access response message includes the second preamble value and a second TA value.

The second TA value is a sum of a first TA value and the time offset or a difference between the first TA value and the time offset, and the first TA value is a TA value that corresponds to the first preamble value detected by the base station.

The random access response message further carries instruction information of an uplink resource allocated by the base station to the target terminal, and the instruction information is used to instruct the target terminal to send an uplink message by using the uplink resource.

Optionally, the base station may alternatively generate a plurality of RAR messages, where a preamble ID carried in some RAR messages is consistent with the preamble ID detected by the base station, and a preamble ID carried in some RAR messages is consistent with the preamble ID allocated by the base station. For details, refer to the descriptions of the embodiment of FIG. 2, and details are not described herein.

207. The base station sends the random access response message to the target terminal.

Optionally, if the base station generates a plurality of RAR messages, the base station sends all of the plurality of RAR messages to the terminal, for the terminal to determine a target RAR message. For details, refer to the descriptions of the embodiment of FIG. 2, and details are not described herein.

208. The terminal sends the uplink message to the base station based on the random access response message.

Refer to the descriptions of the embodiment of FIG. 2, and details are not described herein.

Figure 4:
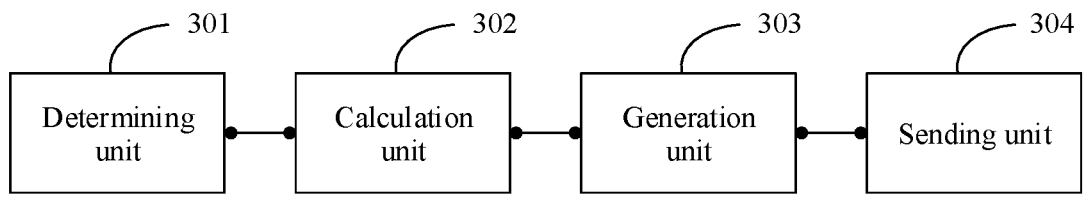
FIG. 4 is a schematic diagram of an example base station according to an embodiment of this application.

Referring to FIG. 4, a base station shown in FIG. 4 is applied to a contention-based access process. An embodiment of the base station according to an embodiment of this application includes:

a determining unit 301, configured to determine that a detected first preamble value is a preamble value sent by a target terminal;

a calculation unit 302, configured to calculate a preamble offset and a time offset of the target terminal;

a generation unit 303, configured to generate at least two random access response messages, where in the at least two random access response messages: at least one of the at least two random access response messages includes a second preamble value and a second timing advance TA value, and at least one of the at least two random access response messages includes a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset; and a sending unit 304, configured to send the at least two random access response messages to the terminal.

Optionally, the determining unit 301 is specifically configured to:

if the quantity of preamble values detected by the base station within a preset time exceeds a preset threshold, determine that the first preamble value currently detected by the base station is the preamble value sent by the target terminal.

Optionally, the calculation unit 302 is specifically configured to:

calculate the preamble offset and the time offset of the target terminal based on a cell logical root sequence and a first cyclic shift (Ncs) of the base station, where the first Ncs is an Ncs used by the base station to detect the first preamble value.

Optionally, the at least two random access response messages each carry instruction information of an uplink resource allocated by the base station to the target terminal, and the instruction information is used to instruct the target terminal to send an uplink message by using the uplink resource.

For specific descriptions of functions of the units in the embodiment of FIG. 4, refer to the descriptions of the random access method in the embodiment of FIG. 2. Details are not described herein.

Figure 5:
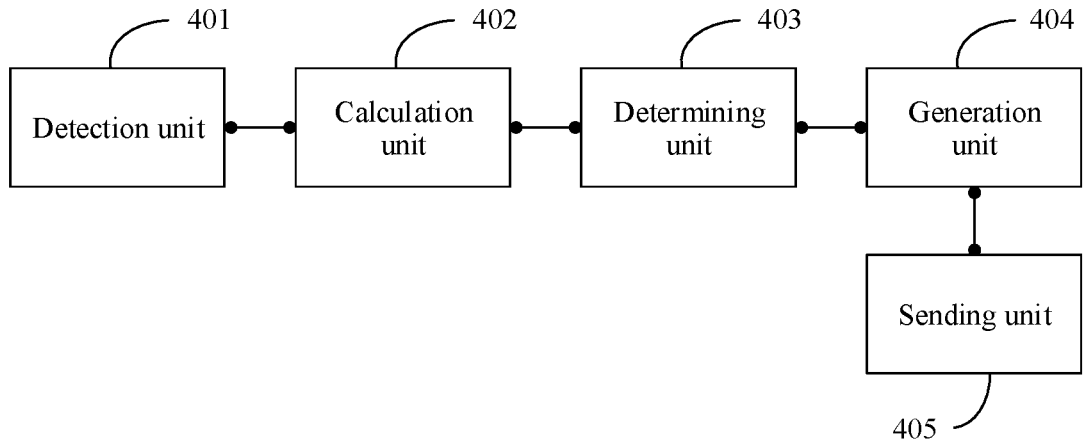
FIG. 5 is a schematic diagram of an example base station according to an embodiment of this application.

Referring to FIG. 5, a base station shown in FIG. 5 is applied to a non-contention-based access process. Another embodiment of the base station according to an embodiment of this application includes:

a detection unit 401, configured to detect a first preamble value;

a calculation unit 402, configured to calculate a preamble offset of a target terminal if the first preamble value is a preamble value falling within an allocated area, and is different from a preamble value allocated by the base station;

a determining unit 403, configured to generate a second preamble value by adding to or subtracting from the first preamble value the preamble offset and determine whether the second preamble value is the same as the preamble value allocated by the base station;

a generation unit 404, configured to generate a random access response message when the second preamble value is the same as the preamble value allocated by the base station, where the random access response message includes the second preamble value; and a sending unit 405, configured to send the random access response message to the target terminal.

Optionally, the calculation unit 402 is further configured to calculate a time offset of the target terminal before the generation unit 404 generates the random access response message, where the random access response message further includes a second timing advance TA value, the second TA value is a sum of a first TA value and the time offset or a difference between the first TA value and the time offset, and the first TA value is a TA value that corresponds to the first preamble value detected by the base station.

Optionally, the calculation unit 402 is specifically configured to:

calculate the preamble offset and the time offset of the target terminal based on a cell logical root sequence and a first cyclic shift (Ncs) of the base station, where the first Ncs is an Ncs used by the base station to detect the first preamble value.

Optionally, the random access response message further carries instruction information of an uplink resource allocated by the base station to the target terminal, and the instruction information is used to instruct the target terminal to send an uplink message by using the uplink resource.

For specific descriptions of functions of the units in the embodiment of FIG. 5, refer to the descriptions of the random access method in the embodiment of FIG. 3. Details are not described herein.

Figure 6:
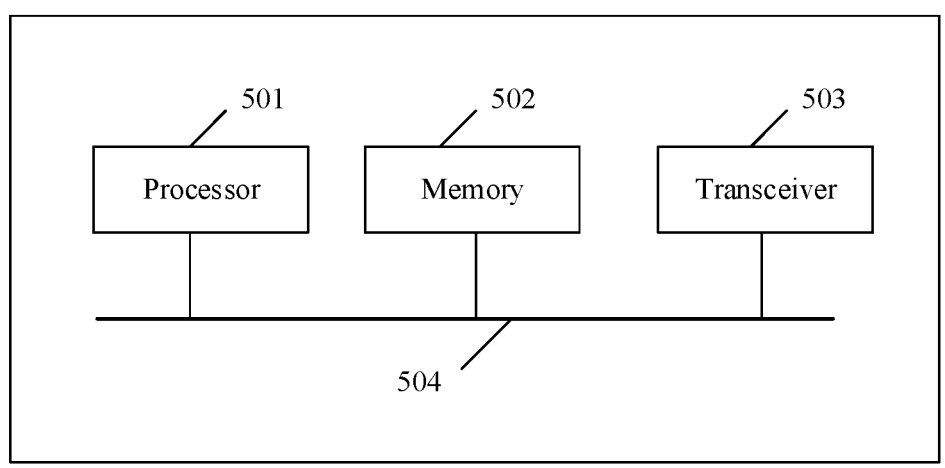
FIG. 6 is a schematic diagram of an example base station according to an embodiment of this application.

The base station described in the embodiments of FIG. 4 and FIG. 5 can be implemented as shown in FIG. 6. Referring to FIG. 6, the base station includes: a processor 501, a memory 502, and a transceiver 503. The processor 501, the memory 502, and the transceiver 503 are connected by using a bus 504. The transceiver 503 may include a transmitter and a receiver. The memory 502 stores a computer instruction, and the processor 501 executes the computer instruction to implement the functions of the base station in the random access method according to the embodiment of FIG. 2 or FIG. 3. Various flexible design manners may be used for a specific implementation. For corresponding functions of the parts, further refer to the method embodiments. No limitation is imposed in the present invention.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A random access method, applied to a contention-based access process, wherein the method comprises:
   determining, by a base station, that a detected first preamble value is a preamble value from a target terminal;
   calculating, by the base station, a preamble offset and a time offset of the target terminal;
   generating, by the base station, at least two random access response messages, wherein at least one of the at least two random access response messages comprises a second preamble value and a second timing advance (TA) value, and at least one of the at least two random access response messages comprises a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset; and sending, by the base station, the at least two random access response messages to the target terminal.

2. The method according to claim 1, wherein the determining, by a base station, that a detected first preamble value is a preamble value from a target terminal comprises:

if a quantity of preamble values detected by the base station within a preset time exceeds a preset threshold, determining, by the base station, that the currently detected first preamble value is the preamble value from the target terminal.

3. The method according to claim 1, wherein the calculating, by the base station, a preamble offset and a time offset of the target terminal comprises:

calculating, by the base station, the preamble offset and the time offset of the target terminal based on a cell logical root sequence and a first cyclic shift (Ncs) of the base station, wherein the first Ncs is an Ncs used by the base station to detect the first preamble value.

4. The method according to claim 1, wherein the at least two random access response messages each carry instruction information of an uplink resource allocated by the base station to the target terminal, and the instruction information is used to instruct the target terminal to send an uplink message by using the uplink resource.

5. A base station comprising:

a processor; and a non-transitory computer readable medium storing a program to be executed by the processor, the program comprises instructions for:

determining that a detected first preamble value is a preamble value from a target terminal;

calculating a preamble offset and a time offset of the target terminal;

generating at least two random access response messages, wherein at least one of the at least two random access response messages comprises a second preamble value and a second timing advance (TA) value, and at least one of the at least two random access response messages comprises a third preamble value and a third TA value; and the second preamble value is the same as the first preamble value, the second TA value is the same as a first TA value that corresponds to the first preamble value detected by the base station, the third preamble value is a sum of the first preamble value and the preamble offset or a difference between the first preamble value and the preamble offset, and the third TA value is a sum of the first TA value and the time offset or a difference between the first TA value and the time offset; and sending the at least two random access response messages to the target terminal.

6. The base station according to claim 5, wherein the program further comprises instructions for:

if a quantity of preamble values detected by the base station within a preset time exceeds a preset threshold, determining that the first preamble value currently detected by the base station is the preamble value from the target terminal.

7. The base station according to claim 5, wherein the program further comprises instructions for:

calculating the preamble offset and the time offset of the target terminal based on a cell logical root sequence and a first cyclic shift (Ncs) of the base station, wherein the first Ncs is an Ncs used by the base station to detect the first preamble value.

8. The base station according to claim 5, wherein the at least two random access response messages each carry instruction information of an uplink resource allocated by the base station to the target terminal, and the instruction information is used to instruct the target terminal to send an uplink message by using the uplink resource.

9. A base station comprising:

a processor; and a non-transitory computer readable medium storing a program to be executed by the processor, the program comprises instructions for:

detecting a first preamble value in a message received from a target terminal;

calculating a preamble offset of the target terminal if the first preamble value is a preamble value falling within an allocated area, and is different from a preamble value allocated by the base station for the target terminal;

generating a second preamble value by calculating a sum of or a difference between the first preamble value and the preamble offset;

determining whether the second preamble value is the same as the preamble value allocated by the base station;

generating a random access response message when the second preamble value is the same as the preamble value allocated by the base station, wherein the random access response message comprises the second preamble value; and sending the random access response message to the target terminal.

10. The apparatus according to claim 9, wherein the program further comprises instructions for:

calculating a time offset of the target terminal before a generation unit generates the random access response message; and the random access response message further comprises a second timing advance (TA) value, the second TA value is a sum of a first TA value and the time offset or a difference between the first TA value and the time offset, and the first TA value is a TA value that corresponds to the first preamble value detected by the base station.

11. The base station according to claim 9, wherein the program further comprises instructions for:

calculating the preamble offset and the time offset of the target terminal based on a cell logical root sequence and a first cyclic shift (Ncs) of the base station, wherein the first Ncs is an Ncs used by the base station to detect the first preamble value.

12. The base station according to claim 9, wherein the random access response message further carries instruction information of an uplink resource allocated by the base station to the target terminal, and the instruction information is used to instruct the target terminal to send an uplink message by using the uplink resource.

* * * * *

UNITED STATES PATENT AND TRADEMARK OFFICE
CERTIFICATE OF CORRECTION

| | | |
|---|---|---|
| PATENT NO. | : 11,229,059 B2 | Page 1 of 1 |
| APPLICATION NO. | : 16/727514 | |
| DATED | : January 18, 2022 | |
| INVENTOR(S) | : Bin Jian et al. | |

It is certified that error appears in the above-identified patent and that said Letters Patent is hereby corrected as shown below:

On the Title Page

In item (73), in Column 1, in "Assignee", Line 1, delete "CO.." and insert -- CO., --.

Signed and Sealed this
Twenty-first Day of June, 2022

Katherine Kelly Vidal
*Director of the United States Patent and Trademark Office*